US009689529B2

(12) United States Patent
Meyer et al.

(10) Patent No.: US 9,689,529 B2
(45) Date of Patent: Jun. 27, 2017

(54) OIL INJECTION UNIT

(71) Applicant: Baker Hughes Incorporated, Houston, TX (US)

(72) Inventors: Aron Meyer, Pryor, OK (US); David Tanner, Broken Arrow, OK (US); Ryan Semple, Owasso, OK (US); Dario Fernando Lana, Broken Arrow, OK (US)

(73) Assignee: BAKER HUGHES INCORPORATED, Houston, TX (US)

( * ) Notice: Subject to any disclaimer, the term of this patent is extended or adjusted under 35 U.S.C. 154(b) by 31 days.

(21) Appl. No.: 14/707,226

(22) Filed: May 8, 2015

(65) Prior Publication Data
US 2015/0323130 A1 Nov. 12, 2015

Related U.S. Application Data

(60) Provisional application No. 61/990,292, filed on May 8, 2014.

(51) Int. Cl.
| F16N 17/00 | (2006.01) |
| F16N 29/02 | (2006.01) |
| F16N 21/00 | (2006.01) |
| F16N 31/02 | (2006.01) |
| E21B 43/12 | (2006.01) |
| E21B 47/00 | (2012.01) |

(52) U.S. Cl.
CPC ............ *F16N 17/00* (2013.01); *E21B 43/128* (2013.01); *E21B 47/0007* (2013.01); *F16N 21/00* (2013.01); *F16N 29/02* (2013.01); *F16N 31/02* (2013.01); *F16N 2210/18* (2013.01); *F16N 2260/00* (2013.01); *F16N 2260/50* (2013.01); *F16N 2270/50* (2013.01)

(58) Field of Classification Search
CPC . F16N 7/14; F16N 11/08; F16N 17/00; F16N 29/02
See application file for complete search history.

(56) References Cited

U.S. PATENT DOCUMENTS

| 2,455,022 | A | * | 11/1948 | Schmidt | F04B 1/14 417/271 |
| 3,947,709 | A | * | 3/1976 | Waltman | H02K 5/132 310/87 |
| 4,262,226 | A | | 4/1981 | Erickson | |
| 4,462,765 | A | | 7/1984 | Rodkin et al. | |
| 4,487,226 | A | * | 12/1984 | Chun | F15B 1/08 138/30 |
| 4,967,882 | A | * | 11/1990 | Meuer | B60R 17/02 184/6.4 |
| 5,626,470 | A | * | 5/1997 | Gerhardt | F04C 29/0021 184/6 |
| 6,041,605 | A | * | 3/2000 | Heinrichs | F25B 49/022 62/193 |

(Continued)

Primary Examiner — Minh Truong
(74) Attorney, Agent, or Firm — Shawn Hunter

(57) ABSTRACT

An oil injection unit to provide motor oil to the motor of an electric submersible pump. The oil injection unit includes an injection module containing an amount of motor oil to be injected into the motor, a sensor to detect a predetermined condition that indicates the need to inject motor oil into the motor, and an injection valve that can be selectively opened to inject motor oil to the motor upon detection by the sensor of the predetermined condition.

17 Claims, 6 Drawing Sheets

(56) References Cited

U.S. PATENT DOCUMENTS

| | | | |
|---|---|---|---|
| 6,167,965 B1* | 1/2001 | Bearden | E21B 43/121 166/105.5 |
| 6,324,858 B1* | 12/2001 | Holden | F04D 13/06 310/53 |
| 6,422,822 B1 | 7/2002 | Holmes | |
| 6,851,935 B2* | 2/2005 | Merrill | F04D 13/083 277/336 |
| 7,104,331 B2 | 9/2006 | Bussear et al. | |
| 7,243,726 B2* | 7/2007 | Ohmer | E21B 43/121 166/304 |
| 7,624,800 B2 | 12/2009 | Jamieson et al. | |
| 7,665,975 B2* | 2/2010 | Parmeter | F04D 13/10 417/423.11 |
| 7,677,051 B2* | 3/2010 | von Borstel | F04C 29/021 417/218 |
| 7,806,670 B2* | 10/2010 | Du | E21B 43/128 310/87 |
| 7,828,058 B2 | 11/2010 | Fielder | |
| 8,230,835 B2* | 7/2012 | Gibson | F01M 1/12 123/196 A |
| 8,322,444 B2 | 12/2012 | De Camargo | |
| 8,430,649 B2 | 4/2013 | Albers et al. | |
| 8,471,551 B2 | 6/2013 | Lake et al. | |
| 8,651,837 B2 | 2/2014 | Tetzlaff | |
| 8,824,241 B2* | 9/2014 | Close | E21B 47/18 175/48 |
| 8,932,034 B2* | 1/2015 | McKinney | E21B 43/128 166/105 |
| 2004/0060607 A1* | 4/2004 | Wheeler | B24B 37/04 137/825 |
| 2005/0087336 A1* | 4/2005 | Surjaatmadja | E21B 43/38 166/105.5 |
| 2006/0157240 A1 | 7/2006 | Shaw et al. | |
| 2007/0074872 A1* | 4/2007 | Du | E21B 4/003 166/369 |
| 2008/0257548 A1 | 10/2008 | Shaw et al. | |
| 2012/0282120 A1 | 11/2012 | Krahn et al. | |
| 2013/0272898 A1* | 10/2013 | Toh | F04D 15/00 417/44.1 |

* cited by examiner

OIL INJECTION UNIT

BACKGROUND OF THE INVENTION

1. Field of the Invention

The invention relates generally to electric submersible pump assemblies used for hydrocarbon production recovery. In particular aspects, the invention relates to lubrication of downhole motors used in electric submersible pump assemblies.

2. Description of the Related Art

A typical electrical submersible pump (ESP) system includes a pump that is driven by a motor. Because the ESP system may be disposed at great depths and is inaccessible at this time, the motors are designed to operate for a long period of time without maintenance. Motor oil is used to help lubricate the motor and to dissipate the heat the motor generates during operation. However, leakage often occurs across mechanical seals in an associated seal section during operation. As the motor operates, it heats up, resulting in expansion of components, which in turn leads to leakage. As pressure drops within the motor due to leakage, the motor can become undesirably prone to fluid ingress by external fluids. Intrusion by these fluids can result in shorting out of the motor, contamination, corrosion and other undesirable effects.

SUMMARY OF THE INVENTION

The present invention provides devices and methods to replenish or provide fresh motor oil to the motor of an electric submersible pump assembly, thereby counteracting leakage of the motor. In a specific embodiment, an oil injection unit is described that can be attached to an existing motor or a motor equalizer to replenish the oil reservoir of the motor/motor equalizer as needed. The injection of fresh motor oil will counteract the leakage and prevent intrusion of external fluids into the motor or to prevent damage to the barrier elements in the equalizer.

Embodiments of the oil injection unit are described which incorporate an accordion-like bellows assembly that can be expanded/contracted axially within a housing and which retains motor oil for replenishment. In some embodiments, the bellows assembly is biased toward a contracted condition by a weight or spring.

Described injection units also include a valve, such as a solenoid valve, that is actuated to inject fresh oil or motor coolant fluid into the motor/motor equalizer. The valve might also be a mechanically actuated or pressure actuated valve. The valve is actuated to flow fresh oil to the motor upon detection of a predetermined condition by a sensor. In certain embodiments, the predetermined condition is an amount of pressure loss within the oil reservoir of the motor. According to other embodiments, the sensor detects intrusion of external fluids into the motor oil reservoir. In still other embodiments, the axial position of the bellows assembly in the oil injection unit is measured. An internal conduit is formed within the outside radial diameter of the outer radial housing of the oil injection unit in which an electrical signal or oil communication path can be established from above and below the apparatus.

According to particular embodiments, a controller is interconnected with the valve and sensor and operates the valve in response to iterative detection of the predetermined condition by the sensor. As a result, the controller provides an active feedback loop which will ensure continued injection of motor oil until the predetermined condition is satisfied (i.e., there is no longer a pressure loss in the oil reservoir of the motor). The controller will then ensure that the injection of oil will stop when the predetermined condition is satisfied.

BRIEF DESCRIPTION OF THE DRAWINGS

For a thorough understanding of the present invention, reference is made to the following detailed description of the preferred embodiments, taken in conjunction with the accompanying drawings, wherein like reference numerals designate like or similar elements throughout the several figures of the drawings and wherein.

DETAILED DESCRIPTION OF THE PREFERRED EMBODIMENTS

Figure 1:
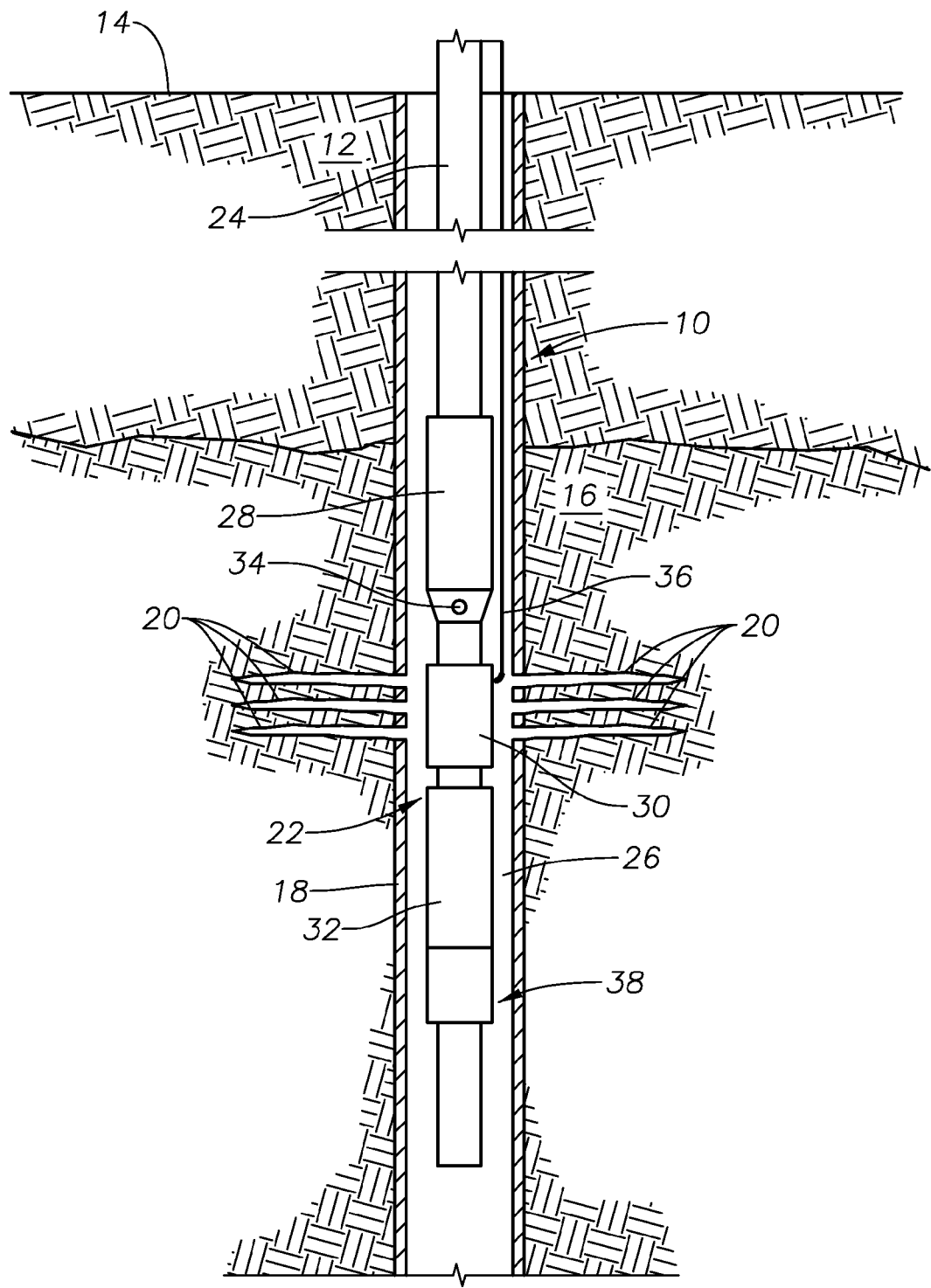
FIG. 1 is a side view of an exemplary electric submersible pump assembly located within a wellbore and including an exemplary injector in accordance with the present invention.

FIG. 1 illustrates an exemplary wellbore 10 that has been drilled through the earth 12 from the surface 14 down to a hydrocarbon-bearing formation 16. The wellbore 10 has been lined with metallic casing 18 of a type known in the art. Perforations 20 are disposed through the casing and into the formation 16, thereby allowing hydrocarbons to enter the wellbore 10.

An electric submersible pump (ESP) assembly, generally indicated at 22, is shown disposed within the wellbore 10 by a coiled tubing running string 24. An annulus 26 is defined between the casing 18 and the running string 24/ESP 22. The ESP assembly 22 includes a pump section 28, a seal section 30 and a motor section 32. As is known, the motor section 32 drives the pump section 28 to draw hydrocarbon fluid in from the wellbore 10 via fluid inlets 34 and flow it to the surface 14. A power cable 36 provides power to the motor section 32 from the surface 14. As is known, the motor section 32 includes an outer housing, a stator and a rotor that is rotatable with respect to the stator. The rotor rotates a shaft that will, in turn, power the pump section 28.

Figure 2:
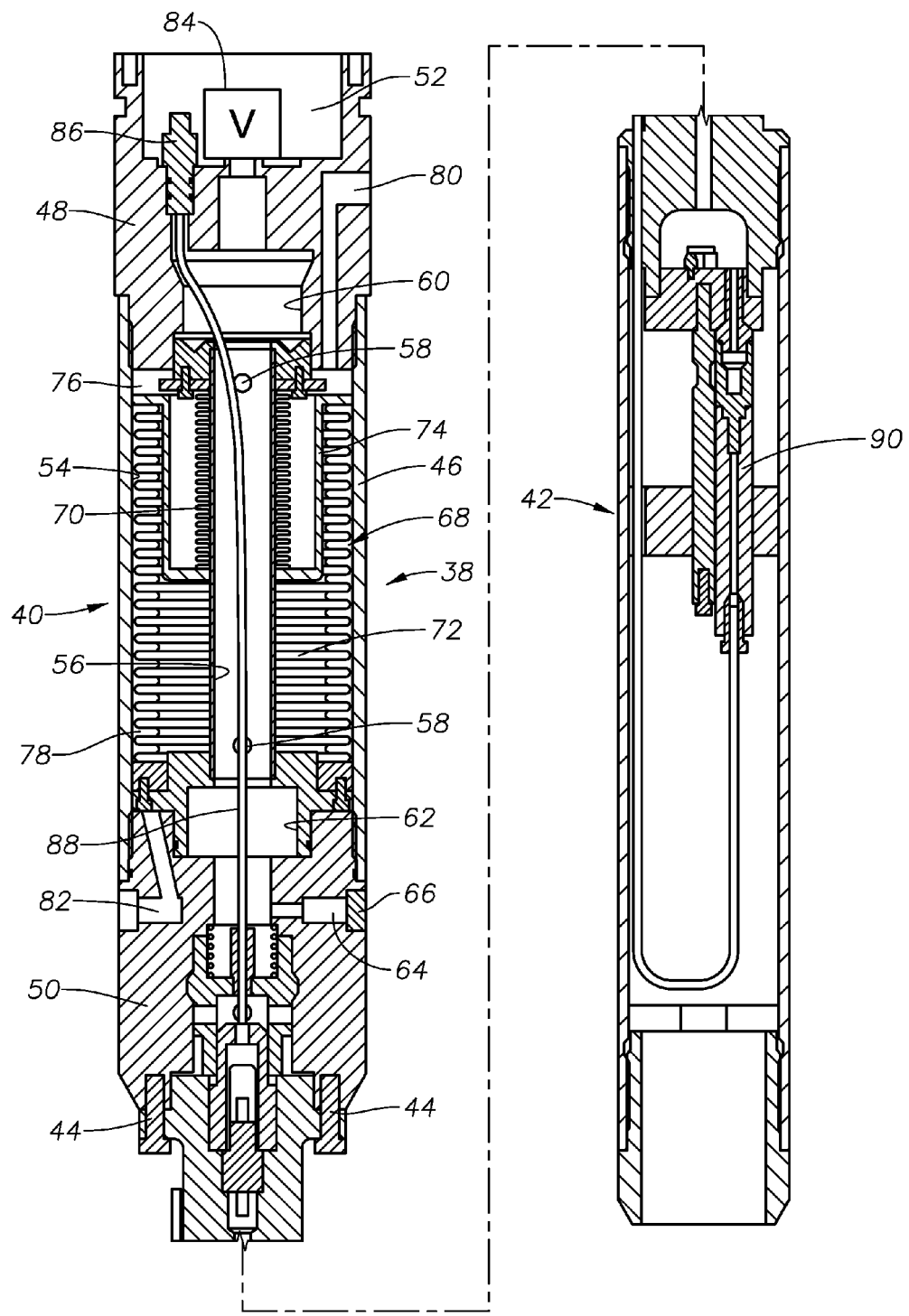
FIG. 2 is a side, cross-sectional view of an exemplary oil injection unit and associated components, in accordance with the present invention, in a first position.
Figure 3:
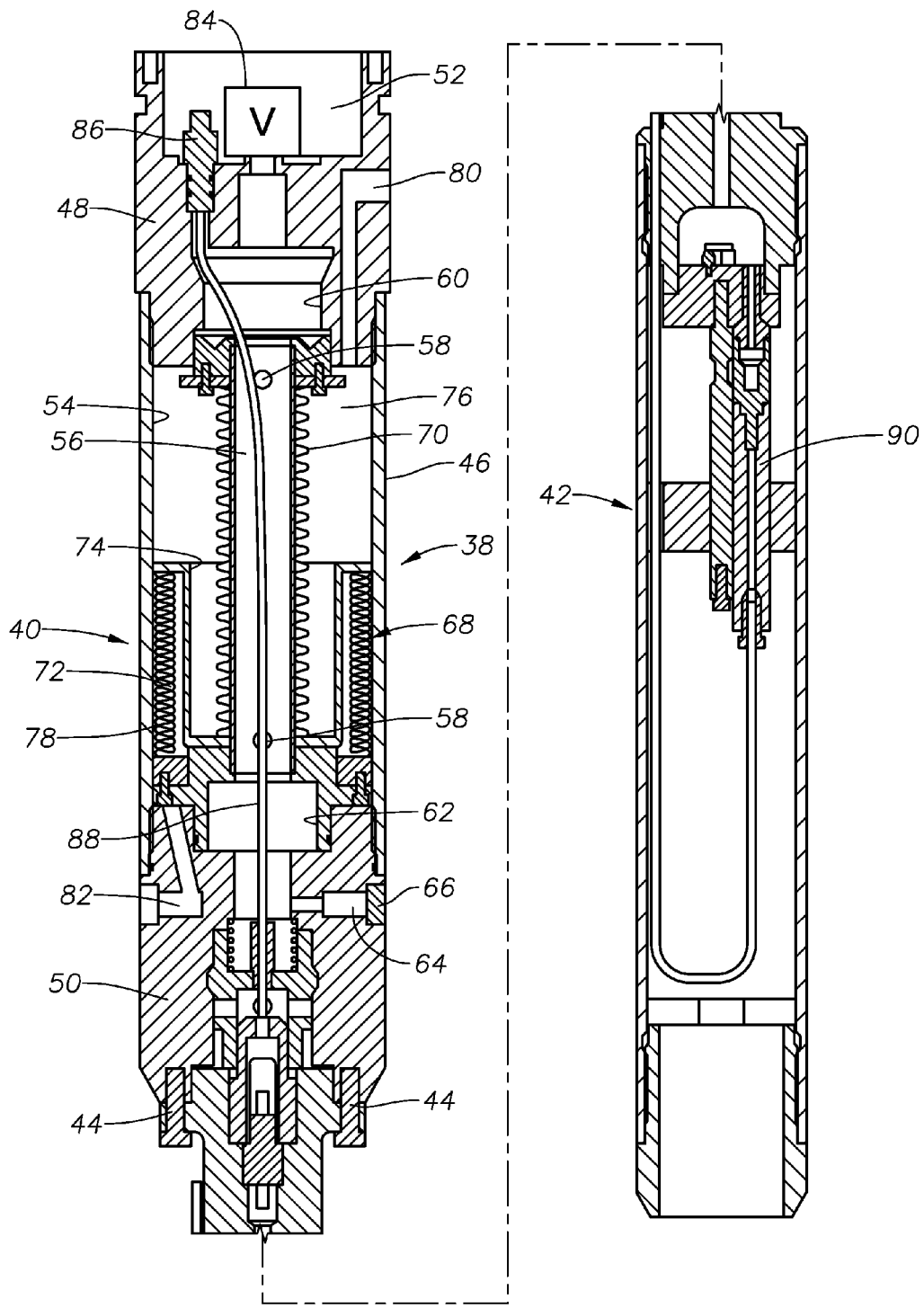
FIG. 3 is a side, cross-sectional view of the injection unit of FIG. 2, now in a second position.

An oil injection unit, or injector, 38 in accordance with the present invention is affixed to a lower end of the motor section 32. An exemplary oil injection unit 38 is depicted in greater detail in FIGS. 2 and 3. The exemplary oil injection unit 38 includes an injection module 40 and a gauge module 42. The injection module 40 and gauge module 42 are affixed to each other by connector screws 44, or in other ways known in the art.

The injection module 40 includes an outer radial housing 46 with an affixed top cap 48 and bottom cap 50. The top cap 48 of the injection module 40 presents a fluid well 52. When the injection module 40 is affixed to the motor section 32, the fluid well 52 is placed in fluid communication with the motor section 32 so that fluid that is flowed into the fluid well 52 will enter the motor section 32.

A bellows chamber 54 is defined within the outer housing 46. A central tube 56 extends axially within the bellows chamber 54. Lateral openings 58 are disposed through the tube 56. The tube 56 extends between an upper oil chamber 60 and a lower oil chamber 62. Fill port 64 allows the lower oil chamber 62, tube 56 and upper oil chamber 60 to be filled with motor oil. Removable plug 66 is used to seal off the fill port 64.

An axially moveable bellows assembly, generally indicated at 68, is disposed within the bellows chamber 54. The exemplary bellows assembly 68 includes an inner, accordion-like bellows 70 that radially surrounds the tube 56 and can be axially extended and collapsed. The bellows assembly 68 also includes an outer bellows 72. The outer bellows 72 can also be axially extended and collapsed in the manner of an accordion. The outer bellows 72 is disposed just inside of the housing 46. A generally cylindrical sleeve 74 is interconnected to both the inner bellows 70 and the outer bellows 72. The bellows assembly 68 separates the bellows chamber 54 into a first chamber portion 76 and a second chamber portion 78. Preferably, the bellows assembly 68 is biased to exert pressure upon the motor oil that is retained within the lower oil chamber 62, tube 56 and upper oil chamber 60.

A first well fluid opening 80 is disposed through the top cap 48 and permits well fluid to enter the first bellows chamber portion 76 from the annulus 26. According to an alternative embodiment, motor fluid is flowed into the first bellows chamber portion 76. A second well fluid opening 82 is disposed through the bottom cap 50 and permits well fluid to enter the second bellows chamber portion 78 from the annulus 26.

An injection valve 84 is positioned within the top cap 48 and controls the flow of motor oil from the upper oil chamber 60 to the fluid well 52. The valve 84 is switchable between a closed position, wherein no motor oil will flow through the valve 84, and an open position, wherein motor oil can flow through the valve 84 to the fluid well 52. Fluid that is injected through the valve 84 into the fluid well 52 will enter the oil reservoir of the affixed motor section 32. In addition, a sensor 86 is disposed within the top cap 48 and positioned to detect one or more predetermined conditions of interest within the fluid well 52. Cable 88 interconnects the sensor 86 with a processor 90 in the gauge module 42. In accordance with an alternative embodiment, the processor 90 is located at surface 14. The programmable processor 90 is interconnected with the injection valve 84 to control operation of the valve 84. In the embodiment depicted in FIGS. 2-5, the cable 88 extends internally axially through the general radial center of the bellows assembly 68. The cable 88 provides an internal conduit formed within the outside radial diameter of the outer radial housing 46 of the oil injection module 40 in which an electrical signal or oil communication path can be established from above and below the apparatus. Thus, it can be seen that the exemplary oil injection unit 38 transmits motor oil and electronic communications internally without the need to have conduits or wires run radially outside of the oil injection unit 38.

In accordance with some embodiments of the invention, the sensor 86 is adapted to detect fluid pressure within the fluid well 52 (and thus, within the motor section 32). In other embodiments, the sensor 86 detects dielectric conductivity of the oil within the fluid well 52. Normally, motor oil contained within the motor section 32 and the fluid well 52 is non-conductive. However, intrusion of external fluids may cause the motor oil within the motor section 32/fluid well 52 to conduct electrical current.

According to still another embodiment, physical displacement of the bellows assembly 68 is determined. The bellows assembly 68 moves axially with respect to the outer housing 46 of the oil injection module 40, as motor oil is transmitted from the injection module 40 to the fluid well 52. A displacement sensor detects the axial position of the bellows assembly 68 with respect to the outer housing 46. The change in axial position would be correlated by the controller 90 with a known amount of motor oil that has been injected into the fluid well 52.

During operation of the ESP assembly 22, the sensor 86 will detect one or more predetermined conditions which indicate a loss of motor oil from the motor section 32. In response, the controller 90 will open the valve 84 to inject motor oil into the fluid well 52/motor section 32. The injection of motor oil will counteract the loss of motor oil that occurs due to typical operation of the motor section 32. In certain embodiments, the valve 84 is a metering valve that injects a set amount of motor oil at a time. In other embodiments, the valve 84 will be opened for continuous injection until subsequently closed based upon a command from the controller 90.

According to preferred embodiments, the sensor 86 and controller 90 provide for iterative detection of the predetermined condition and, upon detection of a need to inject additional oil, will operate the valve 84 to inject further oil. When the indicated condition is no longer detected (i.e., oil pressure at or above a predetermined level), no further oil will be injected. As a result, an active feedback loop is provided to ensure that a minimum level of motor oil is provided to the motor section 32.

Figure 4:
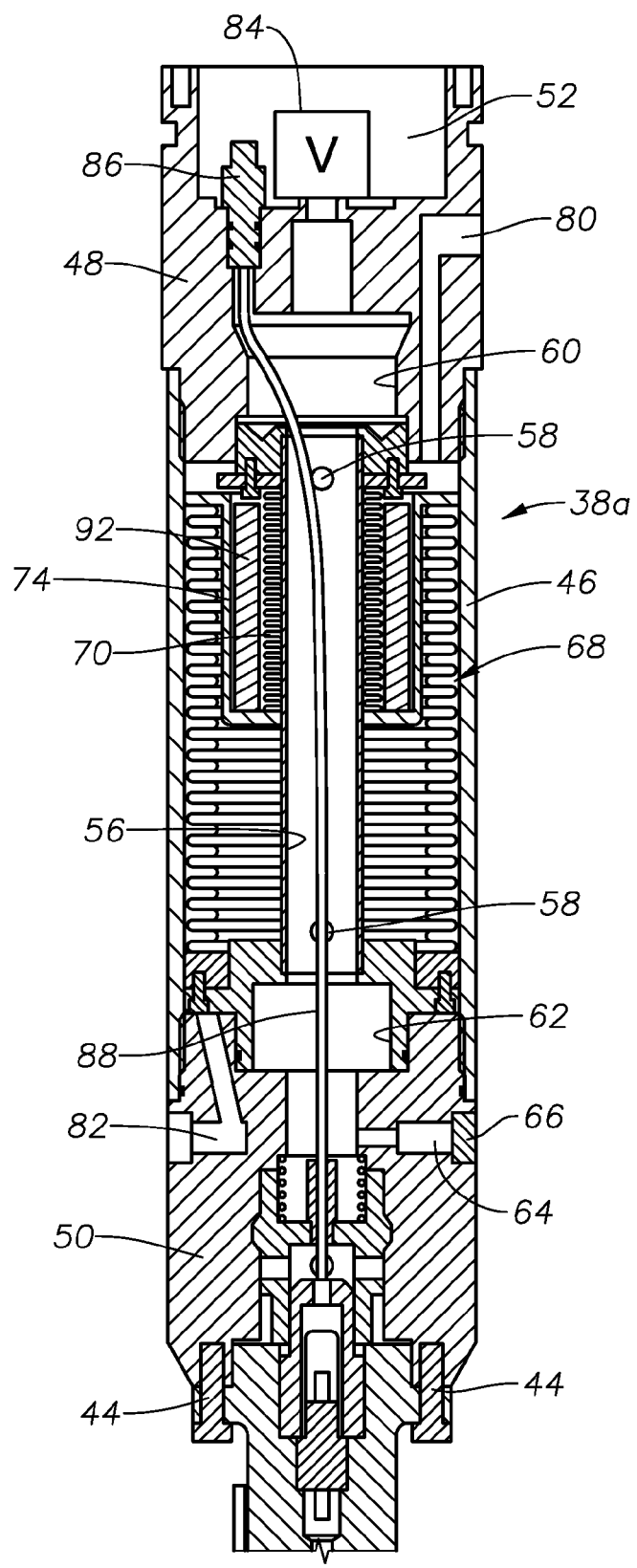
FIG. 4 is a side, cross-sectional view of an exemplary oil injection unit which includes a weight for biasing the bellows assembly.
Figure 5:
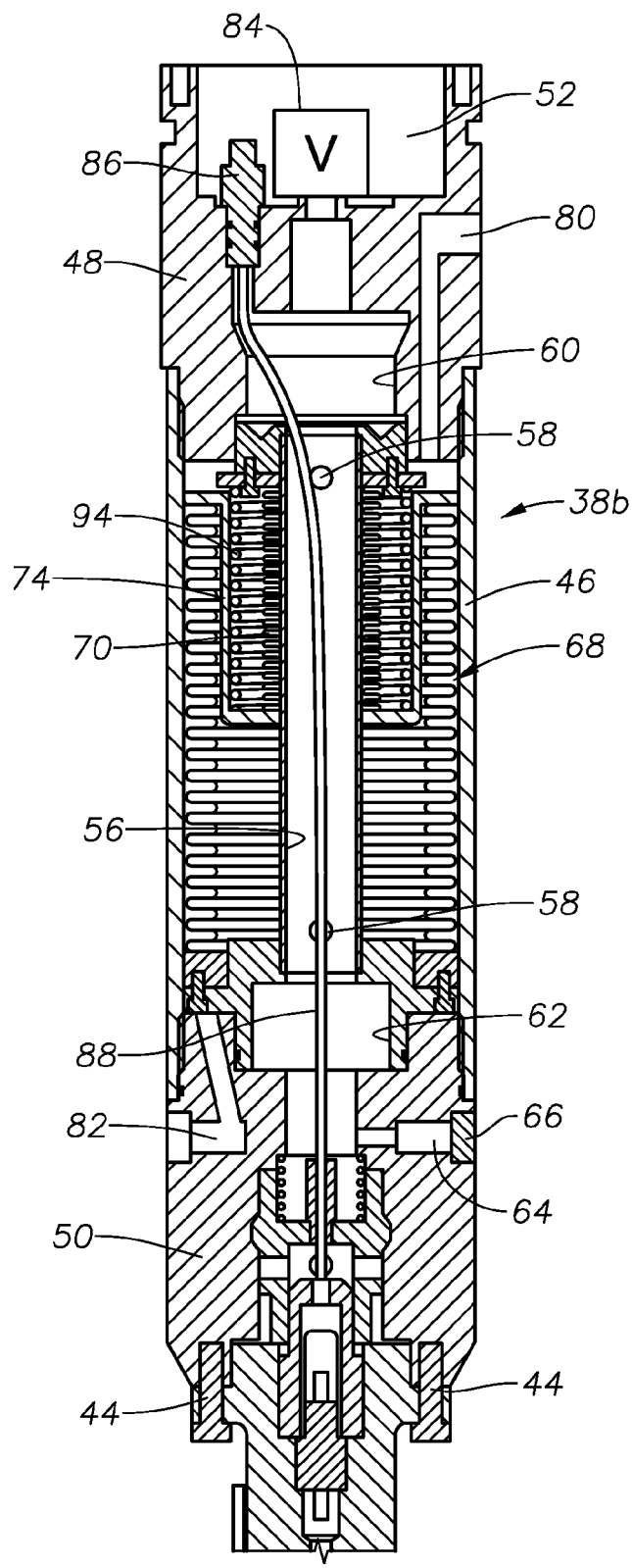
FIG. 5 is a side, cross-sectional view of an exemplary oil injection unit which includes a spring for biasing the bellows assembly.

FIGS. 4 and 5 illustrate exemplary alternative embodiments for oil injector modules 38a, 38b wherein the bellows assembly 68 is biased toward a compressed position so that motor oil contained within the upper oil chamber 60, tube 56 and lower oil chamber 62 is positively pressurized. FIG. 4 illustrates a cylindrical weight 92 which radially surrounds the inner bellows 70 and is seated upon the sleeve 74. When the oil injection unit 38a is disposed within a wellbore 10, the weight 92 will act upon the bellows assembly 68 to apply a positive pressure to the motor oil within the injector unit 38a. This will allow for the injection of oil into the fluid well 52/motor section 32. FIG. 5 illustrates an alternative oil injection unit 38b which uses a compression spring 94 to apply a positive pressure to the motor oil within the injection unit 38b.

Figure 6:
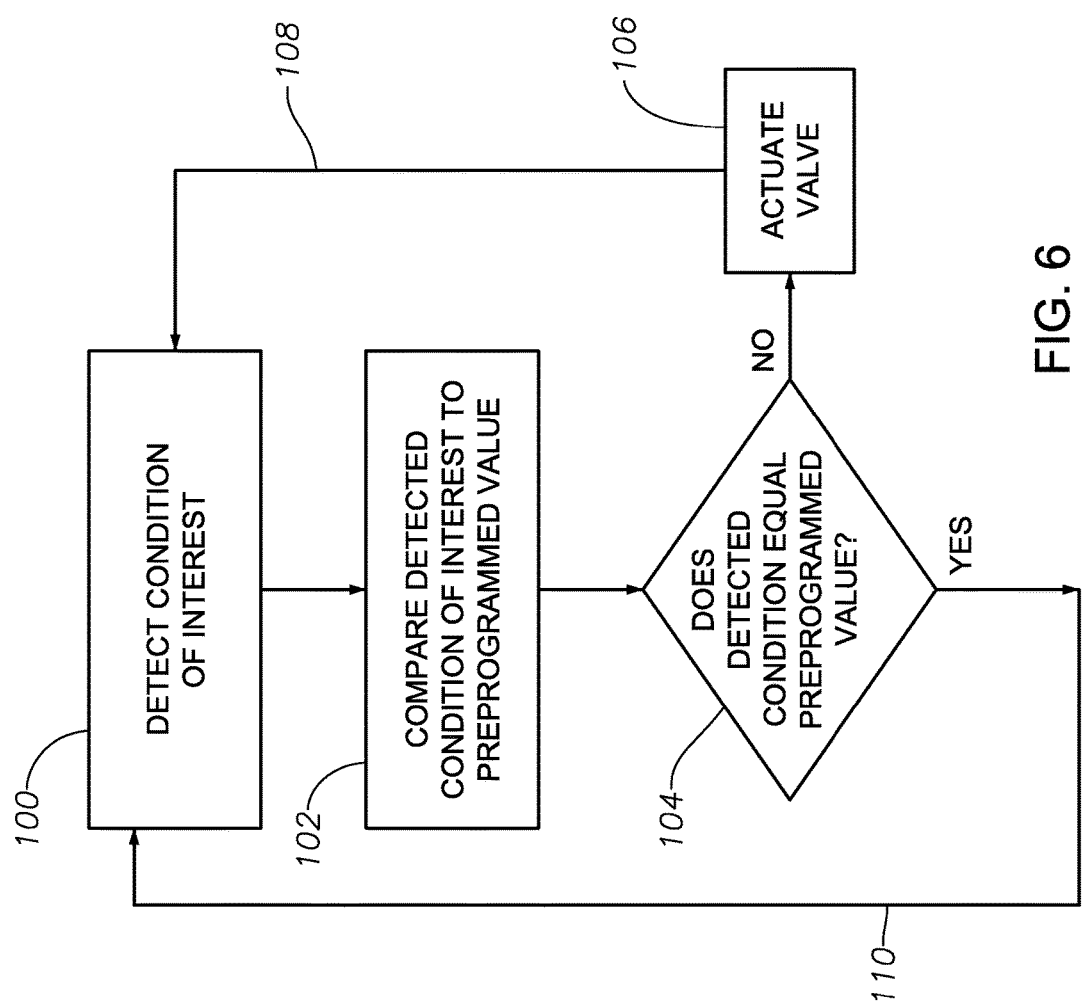
FIG. 6 is a flow diagram depicting exemplary operation of the oil injection unit to provide consistent replenishment of oil to a motor.

FIG. 6 is a flow diagram indicating an exemplary method for providing a consistent supply of motor oil to the motor section 32 using the systems described above. In step 100, the sensor 86 will detect a condition of interest within the fluid well 52 and transmit a signal indicative of the sensed condition to the controller 90. As noted, the condition of interest could be the internal fluid pressure of the motor oil reservoir, dielectric conductivity or bellows position. In steps 102, 104, the controller 90 will compare the detected condition to a preprogrammed value and determine whether the detected condition has reached the preprogrammed value. If the condition of interest is, for example, fluid pressure within the motor oil reservoir, the detected fluid pressure is compared to a predetermined, preprogrammed pressure level (i.e., 500 psi). If the actual detected fluid pressure is less than the preprogrammed pressure level (i.e., 400 psi), the controller 90 will command the valve 84 (in step 106) to inject motor oil from the injection module 40 into the fluid well 52. Thereafter, the steps 100 and 102 are repeated (as indicated by arrows 108, 110) so that, if the oil pressure (or other condition of interest) continues to be below the predetermined, preprogrammed value, the controller 90 will again command the valve 84 (where the valve 84 is a metering valve) to inject additional motor oil from the injection module 40 into the fluid well 52. Where the valve 84 is not a metering valve, and is merely opened for continuous injection, the controller does not command the valve 84 to close.

If the condition of interest meets the predetermined preprogrammed value, the controller 90 will not command the valve 84 to inject further motor oil. In preferred embodiments then, the invention provides devices and methods for substantially ensuring a minimum level of oil pressure within the motor section 32 using a continuous feedback loop.

It is noted that there may be more than one sensor 86, or a multipurpose sensor 86 in order to detect more than one condition of interest. For example, the sensor 86 might be adapted to detect both fluid pressure and dielectric conductivity. In this instance, the controller 90 would be programmed to activate the valve 84 upon detection of either a deficient fluid pressure or a particular amount of dielectric conductivity. Alternatively, the sensor 86 might be adapted to detect fluid pressure while a second sensor (not shown) is operably associated with the controller 90 to provide signals to the controller 90 indicative of bellows position. The controller 90, in this situation, would be programmed to initially actuate the valve 84 when the sensor 86 detects a low fluid pressure condition in the fluid well 52. Thereafter, the controller 90 would actuate the valve 84 based upon detection of bellows position.

Figure 7:
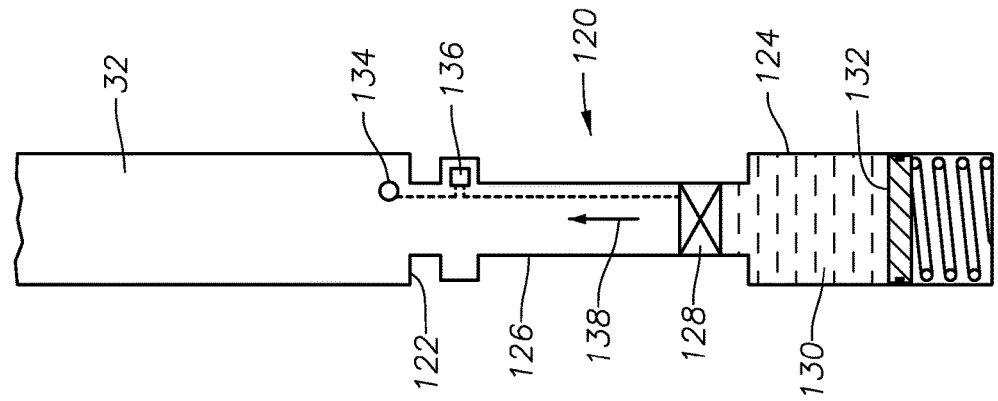
FIG. 7 is a schematic view of a further embodiment for an oil injection unit in accordance with the present invention.

FIG. 7 illustrates a further embodiment for an oil injection unit 120 to provide motor oil to a motor in an electric submersible pump in accordance with the present invention. The oil injection unit 120 provides a means to replace oil that is being used by the motor and seals of the electric submersible pump without running a dedicated line. The oil injection unit 120 is shown operably associated with a lower end 122 of motor section 32. The oil injection unit 120 includes an oil reservoir 124 and passage 126 that interconnects the oil reservoir 124 with the motor 32. An injection valve 128 is retained within the passage 126. The oil reservoir 124 contains an amount of oil 130 for injection into the motor section 32 via the passage 126. In preferred embodiments, the oil reservoir 124 retains a spring-biased piston 132 which will urge the oil 130 toward the passage 126 and exert pressure upon the oil 130. The valve 128 is preferably an electrically actuated valve and selectively controls the flow of oil 130 through the passage 126 from the oil reservoir 124.

In certain embodiments, a sensor 134 is operably associated with the motor section 32 and is operable to detect conductivity of the oil within the motor section 32. A drop in conductivity indicates a loss of oil within the motor section 32. A programmable controller 136 is operably associated with the sensor 134 and the valve 128 and is programmed to operate the valve 128 from a closed to an open position when the controller 136 determines that a predetermined condition has occurred. In certain embodiments, the predetermined condition is a specific loss of conductivity, as measured by the sensor 134, within the motor section 32. In alternative embodiments, the predetermined condition is the passage of a pre-set amount of time, which might be based upon loss of oil known from a previous operative run of the motor section 32. When the valve 128 is opened, oil 130 within the oil reservoir 124 is flowed through the passage 126 in the direction of arrow 138 to replenish oil in the motor section 32.

Those of skill in the art will understand that the invention provides oil injection devices that can be reversibly affixed to an existing motor for an electric submersible pump to provide additional oil to the motor as needed. Also, it is noted that an oil injection unit might be constructed which uses an elastomeric bladder rather than a bellows assembly to compress motor oil within the injection unit. Additionally, multiple oil injection units could be connected in series.

Those of skill in the art will recognize that numerous modifications and changes may be made to the exemplary designs and embodiments described herein and that the invention is limited only by the claims that follow and any equivalents thereof.

What is claimed is:

1. An oil injection unit to provide motor oil to a motor in an electric submersible pump, the oil injection unit comprising:
   an injection module containing an amount of motor oil to be injected into the motor, the injection module being in fluid communication with the motor;
   a sensor to detect a predetermined condition that indicates a need to inject motor oil into the motor, wherein the predetermined condition is an axial position of a bellows assembly in the oil injection unit; and
   an injection valve that can be selectively opened to inject motor oil to the motor upon detection by the sensor of the predetermined condition.

2. The oil injection unit of claim 1 further comprising:
   a programmable controller that is operably associated with the sensor and the injection valve; and wherein
   the controller receives a signal from the sensor that is indicative of the predetermined condition and controls the injection valve in response thereto.

3. The oil injection unit of claim 2 further comprising:
   the bellows assembly retained within the injection module to retain motor oil; and
   an internal conduit is formed within an outside diameter of the oil injection unit in which an electrical signal or oil communication path can be established from above and below the injection module.

4. The oil injection unit of claim 3 wherein the bellows assembly is biased toward a contracted position.

5. The oil injection unit of claim 4 wherein the bellows assembly is biased by a spring or weight.

6. The oil injection unit of claim 2 wherein the controller controls the injection valve in a continuous feedback loop in order to inject motor oil so as to maintain a minimum level of oil pressure within the motor.

7. An oil injection unit to provide motor oil to a motor in an electric submersible pump, the oil injection unit comprising:
   an injection module containing an amount of motor oil to be injected into the motor, the injection module being in fluid communication with the motor;
   a sensor in fluid communication with the motor to detect a predetermined condition that indicates a need to inject motor oil into the motor, wherein the predetermined condition is an axial position of a bellows assembly in the oil injection unit;
   an injection valve that can be selectively opened to inject motor oil to the motor upon detection by the sensor of the predetermined condition; and the bellows assembly retained within the injection module to retain motor oil.

8. The oil injection unit of claim 7 further comprising:
a programmable controller that is operably associated with the sensor and the injection valve; and wherein
the controller receives a signal from the sensor that is indicative of the predetermined condition and controls the injection valve in response thereto.

9. The oil injection unit of claim 7 further comprising:
an internal conduit formed within an outside diameter of the oil injection unit in which an electrical signal or oil communication path can be established from above and below the injection module.

10. The oil injection unit of claim 7 wherein the bellows assembly is biased toward a contracted position.

11. The oil injection unit of claim 10 wherein the bellows assembly is biased by a spring.

12. The oil injection unit of claim 10 wherein the bellows assembly is biased by a weight.

13. An oil injection unit to provide motor oil to a motor in an electric submersible pump, the oil injection unit comprising:
an injection module containing an amount of motor oil to be injected into the motor, the injection module being in fluid communication with the motor;
a sensor to detect a predetermined condition that indicates a need to inject motor oil into the motor, wherein the predetermined condition is an axial position of a bellows assembly in the oil injection unit;
an injection valve that can be selectively opened to inject motor oil to the motor upon detection by the sensor of the predetermined condition;
a programmable controller that is operably associated with the sensor and the injection valve; and wherein
the controller receives a signal from the sensor that is indicative of the predetermined condition and controls the injection valve in response thereto.

14. The oil injection unit of claim 13 further comprising:
the bellows assembly retained within the injection module to retain motor oil; and
an internal conduit is formed within an outside diameter of the oil injection unit in which an electrical signal or oil communication path can be established from above and below the injection module.

15. The oil injection unit of claim 14 wherein the bellows assembly is biased toward a contracted position.

16. The oil injection unit of claim 15 wherein the bellows assembly is biased by a weight.

17. The oil injection unit of claim 15 wherein the bellows assembly is biased by a spring.

* * * * *